(12) United States Patent
Stouffer et al.

(10) Patent No.: US 8,205,755 B2
(45) Date of Patent: Jun. 26, 2012

(54) FILTER MEDIA

(75) Inventors: Mark R. Stouffer, Middletown, CT (US); Richard A. Prince, Westfield, MA (US); Robert E. Astle, Middlefield, CT (US); William J. Feil, III, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 136 days.

(21) Appl. No.: 11/690,055

(22) Filed: Mar. 22, 2007

(65) Prior Publication Data

US 2007/0221569 A1 Sep. 27, 2007

Related U.S. Application Data

(60) Provisional application No. 60/785,397, filed on Mar. 22, 2006.

(51) Int. Cl.
*B01D 39/00* (2006.01)
*B01D 24/00* (2006.01)
*B01D 24/02* (2006.01)

(52) U.S. Cl. ............... 210/502.1; 210/503; 210/483; 210/496

(58) Field of Classification Search ............ 210/502.1
See application file for complete search history.

(56) References Cited

U.S. PATENT DOCUMENTS

| | | | |
|---|---|---|---|
| 2,706,843 A | 4/1955 | Davis | |
| 3,767,351 A | 10/1973 | Blaser | |
| 3,886,088 A * | 5/1975 | DeJong | 502/423 |
| 4,061,807 A | 12/1977 | Shaler et al. | |
| 4,108,670 A | 8/1978 | Steiger et al. | |
| 4,664,683 A * | 5/1987 | Degen et al. | 502/402 |
| 4,753,728 A * | 6/1988 | VanderBilt et al. | 210/282 |
| 4,859,386 A | 8/1989 | VanderBilt et al. | |
| 5,017,318 A | 5/1991 | Vanderbilt et al. | |
| 5,094,736 A | 3/1992 | Greenbank | |
| 5,205,684 A | 4/1993 | Meskin et al. | |
| 5,505,892 A | 4/1996 | Domme | |
| 5,531,260 A | 7/1996 | Burke | |
| 5,593,626 A | 1/1997 | Yagishita | |
| 5,607,595 A | 3/1997 | Hiasa et al. | |
| 5,672,363 A | 9/1997 | Sagawa et al. | |
| 5,725,816 A | 3/1998 | Sagawa et al. | |
| 5,840,348 A | 11/1998 | Heiligman | |
| 6,231,796 B1 | 5/2001 | Allen | |
| 6,558,593 B2 | 5/2003 | Cassani | |
| 6,670,736 B2 | 12/2003 | Horng et al. | |
| 6,682,667 B1 | 1/2004 | Matviya | |
| 6,770,736 B1 | 8/2004 | Haftka et al. | |
| 6,793,866 B2 | 9/2004 | Kelly et al. | |
| 6,998,080 B2 | 2/2006 | Stadermann et al. | |
| 7,112,280 B2 | 9/2006 | Hughes et al. | |
| 2002/0044985 A1 | 4/2002 | Nordell et al. | |
| 2003/0015813 A1 | 1/2003 | Rau et al. | |
| 2003/0089237 A1 | 5/2003 | Jagtoyen et al. | |
| 2004/0040906 A1 | 3/2004 | Jagtoyen et al. | |
| 2004/0168974 A1 | 9/2004 | Hughes et al. | |
| 2005/0121387 A1 | 6/2005 | Kuennen et al. | |
| 2005/0263453 A1 | 12/2005 | Collias et al. | |
| 2005/0269729 A1 | 12/2005 | Holthausen et al. | |
| 2007/0222101 A1 * | 9/2007 | Stouffer et al. | 264/109 |

FOREIGN PATENT DOCUMENTS

| | | |
|---|---|---|
| DE | 3 903 640 | 8/1989 |
| EP | 0 657 388 | 6/1995 |
| EP | 0 661 094 | 7/1995 |
| JP | 3254883 | 11/1991 |
| JP | 5067595 | 3/1993 |
| JP | 7215711 | 8/1995 |
| JP | 08337412 | 12/1996 |
| JP | 10244253 | 9/1998 |
| JP | 11047733 | 2/1999 |
| JP | 11104623 | 4/1999 |
| JP | 11205253 | 7/1999 |
| JP | 200256999 | 9/2000 |
| JP | 2000281325 | 10/2000 |
| JP | 2000313610 | 11/2000 |
| JP | 2000351613 | 11/2000 |
| JP | 2001000859 | 1/2001 |
| JP | 2002012417 | 1/2002 |
| JP | 2002029722 | 1/2002 |
| JP | 2002137911 | 5/2002 |
| JP | 2003334543 | 11/2003 |
| JP | 2005013883 | 1/2005 |
| SU | 392036 | 12/1973 |

OTHER PUBLICATIONS

Faust, S.D; Osman, M.A.. Chemistry of Water Treatment, 2nd Ed. Ann Arbor Press. Chelsea, MI (1998), p. 131-133.*
Miura et al. Production of high density activated carbon fiber by a hot briquetting method. Carbon. vol. 38. (2000) p. 119-125.*
Millipore. "BET". Available at <http://www.millipore.com/membrane/mrc3/bet>, accessed Sep. 17, 2009.*
Akbar et al. Pyrolysis of scrap tires and conversion of chars to activated carbon. AIChE Journal. vol. 39, No. 8 (Aug. 1993) 1370-1376.*
Aygun et al. Production of granular activated carbon from fruit stones and nutshells and evaluation of their physical, chemical, and adsorption properties. Microporous and Mesoporous Materials. vol. 66 (2003) 189-195.*
Savova et al. Biomass conversion to carbon adsorbents and gas. Biomass and Bioenergy. vol. 21 (2001) 133-142.*
Allen, L. "Applications for activated carbons from used tires: butane working capacity", *Carbon*, vol. 37, Issue 9 1999, 1485-1489.
Brady, T. A. "Applications for activated carbons from waste tires: Natural gas storage and air pollution control", *Gas Separation & Purification (0950-4214)*, 10(2) 1996, 97-102.

(Continued)

*Primary Examiner* — Krishnan S Menon
*Assistant Examiner* — Katherine Zalasky

(57) ABSTRACT

Aspects of the present disclosure provide composite carbon blocks with improved capacity for the removal of contaminants such as THMs (trihalomethanes) and trace VOCs (volatile organic compounds) found in water. In one aspect, a filtration matrix comprises a polymeric binder and an adsorptive media comprising activated carbon having a bulk density of 0.54 (0.57, or even 0.60) g/cc or greater. The carbon BET surface area can be 1100 (950, or even 550) $m^2/g$ or less. The polymeric binder can be ultra high molecular weight polyethylene. Also provided are methods of making filtration matrixes.

14 Claims, No Drawings

OTHER PUBLICATIONS

Giavarini, C. "Active carbon from scrap tyres", *Fuel (Guildford) (0016-2361)*, 64(9) 1985, 1331-1332.

Ioannidou, O. "Agricultural residues as precursors for activated carbon production-A review", *Renewable & Sustainable Energy Reviews (1364-0321)*, 11(9) 2007, 1966-2005.

Ko, D. "Production of activated carbons from waste tire—process design and economical analysis", *Waste Management 24* 2004, 875-888.

Lin, Y. "Mesoporous materials form waste tires and their application to wastewater discolorization", *Microporous and Mesoporous Materials*, 54 2002, 167-174.

Miguel, G. S. "The leaching of inorganic species form activated carbons produced form waste tyre rubber", *Water Research 36* 2002, 1939-1946.

Mui, E. "Production of active carbons form waste tyres—a review", *Carbon 42* 2004, 2789-2805.

Murillo, R. "Production and application of activated carbons made from waste tire", *Ind. Eng. Chem. Res*, 44 2005, 7228-7233.

Nakagawa, K. "Adsorption of phenol and reactive dye from aqueous solution on activated carbons derived from solid wastes", *Water Research 38* 2004, 1791-1798.

"Adsorbed natural gas storage with activated carbons made from Illinois coals and scrap tires", *Energy & Fuels (0887-0624)*, 11(2) 1997, 316-322.

Suuberg, E. "Porosity development in carbons derived from scrap automobile tires", *Carbon 45* 2007, 1719-1726.

\* cited by examiner

FILTER MEDIA

CROSS-REFERENCE TO RELATED APPLICATIONS

This application claims the benefit of priority under 35 U.S.C. §119(e) to U.S. Provisional Application No. 60/785,397, filed Mar. 22, 2006, the disclosure of which is hereby incorporated by reference in its entirety.

TECHNICAL FIELD

The present disclosure relates to filter media. More specifically, provided are filter media formed from composite blocks of carbon and polymeric binder for use in water filtration systems.

BACKGROUND

Composite blocks of adsorptive material, such as adsorbent activated carbon, and polymeric binders, such as ultra high molecular weight polyethylene (UHMW PE), are useful in water filter technology. Carbon block technology, for example, provides comparable functionality of loose bed carbon particles, for example, removal of organic contaminants from water, without the mess or taking up too much space.

As is known to those skilled in the art, THMs (trihalomethanes) are a common contaminant in drinking water, being formed by the reaction of chlorine (used for disinfection) with naturally occurring organic matter in water. THMs are suspected carcinogens and also can impart taste and odor to water. Another common drinking water contaminant is methyl t-butyl ether (MTBE), a water-soluble gasoline additive. Removal of THMs, MTBE, and other VOCs from drinking water is typically accomplished by physical adsorption on activated carbon. However, the capacity of activated carbon for THMs, MTBE, and similar VOCs is lower than presently designed. For example, capacity data published by the US EPA (Dobbs, 1980) for chloroform on activated carbon is only 0.012 g/100 g at 15 ppb.

Water filters used in the prior art for removal of THMs commonly employ carbon blocks, manufactured by binding smaller activated carbon particles with a binder such as polyethylene. The design of carbon blocks for water filters for consumer applications is driven by the need for carbon blocks to have a relatively small physical size. The use of smaller carbon particles has in the past allowed blocks to be made small, while maintaining the kinetics required for removal of contaminants. Therefore, the removal of THM and VOCs by carbon blocks has been limited by equilibrium adsorption capacity.

Prior art for maximizing performance for THM and VOC have tended to use activated carbons with surface areas above a minimum value. For example, Toshiro (JP7215711) discloses a method for THM removal based on an activated carbon with surface area >1500 $m^2/g$. In another example, Tsushima et al. (JP00256999) disclose a water purifier for THM employing an activated carbon with surface area greater than 1300 $m^2/g$. Because the process of activating carbon involves removing carbon atoms to create pores and internal surface area, higher surface area carbons have lower densities than lower surface area carbons made from the same raw material.

It is desirable to provide water filters having increased capacity for THMs and trace VOCs in a small carbon block. This is done by maximizing the capacity of activated carbon used in a block on a per volume basis and by maximizing the amount of carbon in a composite carbon block (by minimizing the binder content).

There is an on-going need to increase capacities for contaminants in water filter media. Further, there is a need to reduce the amount of binder needed in these filters.

SUMMARY

Provided are filtration matrixes for the removal of contaminants from water. In one aspect, a filtration matrix comprises a polymeric binder and an adsorptive media, the adsorptive media comprising an activated carbon having a bulk density of 0.54 (in some embodiments, 0.55, 0.56, 0.57, 0.58, 0.59, or even 0.60) g/cc or greater. In one or more embodiments, the carbon BET surface area is 1100 (in some embodiments, 1000, 950, 900, 850, 800, 750, 700, 650, 600, or even 550) $m^2/g$ or less.

In one or more embodiments, the polymeric binder comprises ultra high molecular weight polyethylene. In one embodiment, the polymeric binder is present in an amount of no greater than 30 (in some embodiments, 25, 20, 15, 14, 13, 12, 11, or even 10)% or less of the total weight of the matrix. In another embodiment, the adsorptive media is present in an amount of at least 70 (in some embodiments, 75, 80, 85, 86, 87, 88, 89, or even 90) % of the total weight of the matrix. In one or more embodiments, the adsorptive media comprises activated carbon and/or a lead-removal media.

Other embodiments provide filtration matrixes having a VOC capacity according to NSF-53 is 20 (in some embodiments, 30, or even 40) gal/$in^3$ or greater.

In another aspect, provided is a method of making a filtration matrix comprising: mixing an adsorptive media comprising an activated carbon with ultra high molecular weight polyethylene to form a mixture, wherein the activated carbon has a bulk density of 0.54 g/cc or greater and a BET surface area of 1100 $m^2/g$ or less; filling a mold with the mixture; heating the mold to a temperature in the range of 160° C. to 200° C.; and cooling the mold. In one or more embodiments, the temperature range is 175° C. to 180° C.

In an embodiment, wherein the adsorptive media is present in an amount in the range of 50 to 90% by weight and ultra high molecular weight polyethylene in an amount in the range of 10 to 50% by weight In one embodiment, impulse filling is used to fill the mold. Reference to "impulse filling" means that a force is applied to the mold, causing a discrete, substantially vertical displacement that induces movement of at least a portion of the particles in the mold, causing the particles to assume a compact orientation in the mold. This includes indirect methods such as hammer blows to a table to which the molds are clamped and impacts to the table from a pneumatic cylinder, and any suitable direct methods that displace the molds with a series of jarring motions. In some embodiments, the impulse filling comprises a series of discrete displacements (i.e., impulses) applied to the mold. Impulse filling differs from vibration in that there is a period of non-movement or of little movement between the displacements. The period between displacements is typically at least 0.5 (in some embodiments, at least 1, 2, 3, 5, or even at least 10) seconds. The displacement applied to the mold has a vertical component. In some preferred embodiments, the vertical component (as opposed to the horizontal component) accounts for a majority (in some embodiments, a substantial majority (>75%), or even nearly all (>90%)) of the molds movement.

In a detailed embodiment, the impulse filling is used to fill a plurality of molds, and wherein a plurality of filtration matrixes is formed. In one or more embodiments, a standard deviation of the average weight of the plurality of filtration matrixes is no greater than 10 (in some embodiment, 9, 8, 7, 6, 5, 4, 3, 2, or even 1) % of the average weight.

In a further embodiment, vibration filling is used to fill the mold.

In one or more embodiments, the method further comprises compressing the mixture until a fixed length of the filtration matrix is obtained.

DETAILED DESCRIPTION

Aspects of the present disclosure provide composite carbon blocks with improved capacity for the removal of THMs (trihalomethanes) and trace VOCs (volatile organic compounds) found in water. As is known in the art, the capacity of activated carbon for THMs and lower molecular weight, partially soluble VOCs is low. Additionally, composite carbon block design for water filtration has heretofore been driven to smaller and smaller filter sizes; therefore, water filter performance for a fixed-volume filter is limited by the equilibrium capacity for THM adsorption. Hence, it is desirable to maximize the capacity of carbon filter blocks utilized in the filtration of water for removal of THM and partially soluble VOCs (such as methyl t-butyl ether, MTBE) by selecting activated carbon base materials with specific properties and by maximizing the content of activated carbon media in the blocks.

Surprisingly, it has been found that activated carbons made from nut shells having bulk densities of approximately 0.54 (in some embodiments, 0.55, 0.56, 0.57, 0.58, 0.59, or even 0.60) g/cc or greater and BET surface areas of 1100 (in some embodiments, 1000, 950, 900, 850, 800, 750, 700, 650, 600, or even 550) $m^2/g$ or less perform markedly better for reducing THM and VOC compared to previous carbon blocks made with commercial carbons with lower densities and/or higher surface areas. Increases in THM capacity by about 2× to about 5× have now been demonstrated for carbon blocks formulated with such carbons. Moreover, carbons that meet the criteria for density (>0.54 g/cc) and surface area (>1100 $m^2/g$) have a pore structure that is well suited for trace VOC removal. The carbon materials described in accordance with this disclosure are atypical of commercially available activated carbons for making composite blocks for water treatment applications.

Typical activated carbons manufactured from nut shells for carbon blocks for water treatment applications have BET surface areas in excess of about 1100 $m^2/g$ and bulk densities of around about 0.50 g/cc or less. Activated carbons sold for making blocks for water treatment with a specification for surface area usually have only a minimum specified value. Most commercially-available carbons used for carbon blocks for water adsorption processes specify the BET surface area minimum to be greater than 1100 $m^2/g$. Also, most commercially-available carbons used for carbon blocks for water adsorption processes do not have specifications for bulk density.

A further advantage of activated carbons with the specified properties mentioned above is that they require relatively less binder on a per-mass basis when formed into composite carbon blocks than the standard commercial carbons used previously. The utilization of relatively less amounts of binder allows for the relative maximization of the content of active media in formulated carbon blocks and thus, maximizes the capacity of the formulated composite carbon blocks to remove VOCs.

The carbons determined optimum for use in carbon blocks for VOC and THM removal have the following characteristics/properties. The carbon blocks were manufactured using carbon from a nut shell raw material, such as, for example, coconut shells. Bulk density of the carbons, as measured by one of ASTM standard test methods B527, D4164, or D4781, or by a similar method, are greater than or equal to about 0.54 (in some embodiments, 0.55, 0.56, 0.57, 0.58, 0.59, or even 0.60).

In one or more embodiments, the surface area of the carbons, as measured by nitrogen adsorption and calculated by the method of Brunauer, Emmitt and Teller (BET) is 1100 (in some embodiments, 1000, 950, 900, 850, 800, 750, 700, 650, 600, or even 550) $m^2/g$ or less.

In one specific representative embodiment of the present disclosure, the carbon, as characterized, above is mixed with a binder, typically polyethylene and formed into a composite shape with heat, for example by molding or by extrusion, or any other known process for achieving satisfactory results in the formulation of an end product composite carbon block filter. In one or more embodiments, the polyethylene is ultra high molecular weight polyethylene (UHMW PE). In one representative of embodiment of the present disclosure, the vibration techniques used in the Hughes et al. publication U.S. 2004/0168973 is replaced by tapping, that is, a series of discreet vertical displacements of the mold. This technique results in a closer approach to the maximum uncompressed density for the powder, such as, for example, a mixture of UHMW PE and filtration media, contained in the mold. It was found that by replacing vibration by tapping, higher density and less cracking was observed in the end product carbon blocks. It was also found that with tap filling, intact carbon blocks could be produced utilizing less binder than was utilized with the prior art techniques. Further, filling by tapping was observed to result in less variability in the mold fill weight and less variability in the carbon block porosity and flow properties.

Carbons having the properties specified above have been found to require relatively less binder to produce composite carbon blocks having commercially satisfactory properties and satisfactory physical integrity. In fact, representative commercially satisfactory composite carbon blocks have been made from materials having as little as about 10% binder by weight. In one embodiment, the polymeric binder is present in an amount no greater than 30 (in some embodiments, 25, 20, 15, 14, 13, 12, 11, or even 10) %. In another embodiment, a formulation used in the manufacture of composite carbon blocks includes UHMW PE binder in an amount of no greater than 30 (in some embodiments, 25, 20, 15, 14, 13, 12, 11, or even 10) %. Presently utilized commercial carbon blocks using standard carbons (i.e., BET>1100 $m^2/g$ and bulk density of 0.50 g/cc or less) typically have binder levels ranging from about 30 to about 55%.

Thus, utilizing an aspect of the present disclosure, the active media contained in the representative composite carbon blocks formulated and manufactured in accordance with the present disclosure, comprise up to 90 (in some embodiments, 90, 85, 80, 75, or even 70) % of the filter block, versus about 45% to about 70% when compared to those composite carbon blocks formulated and manufactured in accordance with the prior art.

The increase in the percentage of carbon in the block along with the increase in capacity for trace organics results in a significant increase in VOC capacity per unit block volume (2×-6× greater than current state of the art). For example, filters made per the subject invention have shown VOC capacity greater than 40 gallons per cubic inch of block volume. Typical commercial carbon blocks have capacities <15 gallons per cubic inch of block volume. The following define specific terms, as they are understood to be used to the present disclosure.

Use of the term "UHMW PE" herein is intended to encompass ultra high molecular weight polyethylene having a molecular weight as described in commonly-owned U.S. Pat. No. 7,112,280, to Hughes et al., entitled "GAS POROUS POLYMER FILTER AND METHODS OF USE," the disclosure of which is herein incorporated by reference to the extent not inconsistent with the present disclosure.

The term "composite blocks" as used in this present application shall be understood to mean filter elements produced by mixing media particles with a binder to immobilize the media particles. One specific example of the term, as used in the present disclosure, includes but is not limited to, a molded carbon block used for water filtration, which may include media: any material used to remove a contaminant, for example, activated carbon, lead removal media, diatomaceous earth, antimicrobial media, silica, zeolite, alumina, ion exchangers, arsenic removal media, molecular sieves, charge modified particles, titanium silicates, titanium oxides, and metal oxides and hydroxides or any operable combination of the above.

By the terms "fluid and/or liquid," we mean any fluid and/or liquid capable of being processed through composite carbon block filters, including, not limited to, potable water, non potable water, industrial liquids and/or fluids or any liquid and/or fluid capable of being processed through a filtration apparatus.

By the term "contaminant," it is meant a substance or matter in the fluid that has a detrimental effect on the fluid or subsequent processing or use of the fluid.

By the term "separation," we mean the method by which contaminants are removed from a fluid by flowing the fluid through a porous structure.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

EXAMPLES

TABLE 1

| Glossary | | |
|---|---|---|
| Designation | Description | Availability |
| Wood based Carbon | 325 mesh Activated Carbon | CECA Specialty Chemicals, Paris, France |
| "TICONA GUR 2126" | Ultra High Molecular Weight Polyethylene | Ticona Engineering Polymers, Winona, Minnesota |

TABLE 1-continued

| Glossary | | |
|---|---|---|
| Designation | Description | Availability |
| "TICONA GUR 4150-3" | Ultra High Molecular Weight Polyethylene | Ticona Engineering Polymers |
| "KURARAY YPG25" | Activated Carbon | Kuraray Chemical Co., Osaka City, Japan |
| "KURARAY PGW-20MD" | Activated Carbon | Kuraray Chemical Co. |
| "KURARAY PGW-100MD" | Activated Carbon | Kuraray Chemical Co. |
| "KURARAY PGW-100MP" | Activated Carbon | Kuraray Chemical Co. |
| "KURARAY YPG90" | Activated Carbon | Kuraray Chemical Co. |
| "KURARAY CG 80X325" | Activated Carbon | Kuraray Chemical Co. |
| "CALGON 3163" | Activated Carbon | Calgon Carbon Corporation, Pittsburgh, Pennsylvania |
| "CALGON 3164" | Activated Carbon | |
| "PICA NC506" | Activated Carbon | PICA Activated Carbon, Columbus, Ohio |
| "PACCO HMM" | Activated Carbon | Pacific Activated Carbon, Warrendale, Pennsylvania |
| "PICA GX203" | Activated carbon | PICA Activated Carbon |
| "ENGELHARD ATS" | Ceramic cation exchanger | BASF Catalysts, Iselin, New Jersey |

Comparative Example C1

The following formulation: Wood based carbon (35%), "TICONA GUR 2126" (43%), "TICONA GUR 4150-3" (22%), totaling 1200 grams, was charged to a container and mixed (about 600 rpm) using a drill press fitted with a paint mixing paddle. The resulting mixture was added to 8 molds secured to the table (aluminum pipe with top and bottom plate and mandrel), while vibrating, using a vibration table and an electric vibrator (Model US400 Available from Vibco, Wyoming, Rhode Island). The molds were then heated to about 180° C. in a convection oven (available from Blue M, White Deer, Pennsylvania) for about 2 hours. The molds were cooled to room temperature and the resulting carbon blocks were ejected from the molds. Weights of the cooled carbon block varied from 60.1 to 68.5 grams (average weight=64.3 grams). All 8 of the resulting carbon blocks exhibited major cracking.

Example 1

The procedure described in Comparative Example C1 was followed with the exception that the molds, secured to the filling table, were filled while the molds were subjected to vertical displacements of the filling table by rapping the table with a hammer. Hammer blows were applied on the top of the table approximately every 2 seconds for about three minutes, until the mold was completely filled. Carbon blocks produced had weights ranging from about 73.1 to about 77.0 grams (average weight=75.0 grams). All of the resulting carbon blocks were intact with no apparent cracking. The carbon blocks were then made into water filters by gluing end caps on the carbon blocks and inserting the end capped blocks into housings. The filters were tested for air pressure drop. This is the pressure drop that occurs when 25 liter/min of air at 25° C. is passed through the carbon block, from the outside to the inside of the filter. The air pressure drop at 25 liter/min ranged from about 31.8 to about 36.9 inches water, which indicates very consistent carbon block porosity. Methods of making a carbon block of Example 1 resulted in about a 16% higher density, than the carbon blocks made using the method of Comparative Example C1, using the average weights of each example.

Comparative Example C2

The procedure described in Comparative Example C1 was followed with the exception that end-of-tap water filters were made by gluing end caps on the carbon blocks and inserting the end capped blocks into housings, using the following formulation: "KURARAY YPG25" (30%), "PICA GX203" (16%), "TICONA GUR 2126" (14%), "TICONA GUR 4150-3" (34%) and "ENGELHARD ATS" (6%), totaling about 5000 grams. Seventy-five percent (75%) of carbon blocks tested passed NSF 53 testing for cryptosporidium reduction. The NSF 53 service life for VOC removal was 130 gal.

Example 2

The procedure described in Comparative Example C2 was followed with the exception that the formulation: "KURARAY YPG90" (25%), "KURARAY YPG25" (45%), "TICONA GUR 2126" (12.5%), "TICONA GUR 4150-3" (12.5%) and "ENGELHARD ATS" (5%), totaling about 1800 grams and using vertical displacements of the filling table as described in Example 1. One hundred percent (100%) of the carbon blocks tested passed NSF 53 testing for cryptosporidium reduction The NSF 53 service life for VOC removal was over 200 gallons (non-detect VOC in the effluent at 200 gal).

Comparative Example C3

Carbon blocks for a faucet mount, fitted with an end cap and installed in a cartridge, were made using the following formulation: "KURARAY YPG100MD" (30%), "KURARAY YPG20MD" (43%), "TICONA GUR 2126" (10%), TICONA GUR 4150-3 (10%) and "ENGELHARD ATS" (7%), totaling about 5000 grams, charged to a mixer as described in Comparative Example C2 and mixed for about 13 minutes The resulting mixture was added to molds using a vibration table comparable to that described in Comparative Example C2. The molds were heated to 350° F. (177° C.) and compressed. The compression was performed with a constant force of 31 pound force per block throughout the heat cycle using a variable distance pneumatic air cylinder capable of delivering about 2000 lbs force with an air supply of 80 psig. The block was not compressed to a fixed length. After heating and compression, the molds were cooled to about 100° F. (38° C.) using water and the carbon blocks were ejected from the molds. The resulting molded carbon block lengths for a batch of 48 carbon blocks produced resulted in a mean length of 5.426 inches (13.78 cm), maximum length of 5.470 inches (13.89 cm), minimum length of 5.310 inches (13.49) with a standard deviation of the length of 0.049. If necessary, the carbon blocks were trimmed to a length of 5.32 inches (13.51 cm).

Comparative Example C4

Sixty-four carbon blocks were made using the same formulation as Comparative Example C3, with the exception that the molds were not compressed during the heat cycle. The resulting carbon blocks had an average length of 5.721 inches (14.53 cm). The carbon blocks were trimmed to the length of 5.32 inches (13.51 cm).

Example 3

Sixty-four carbon blocks were made using the same formulation as Comparative Example C3 with the exception that the molds were compressed at a fixed distance of 0.550 inches (1.4 cm) during the heat cycle. The compressive force varied over time during baking. The fixed length compression was accomplished using a tabbed piston 30. The resulting molded carbon block lengths for a batch of 64 carbon blocks produced resulted with a mean length of 5.321 inches (13.52 cm), maximum length of 5.328 inches (13.53 cm), minimum length of 5.316 inches (13.50) with a standard deviation of the length of 0.004. The molded carbon blocks were used without trimming.

Example 4

Sixty-four (64) carbon blocks for a faucet mount application were made using the procedure described in Example 1 with the exception that the following formulation: "YPG 100MD" (30%), "YPG 20MD" (43%), "TICONA GUR 2126" (10%) "TICONA GUR 4150-3" (10%) and "ENGELHARD ATS" (7%), totaling about 5000 grams, was used. This mixture was added to molds by vertical displacement filling. The molds were heated to 350° F. (177° C.) and compressed to a fixed length of 5.4 inches (13.7 cm). The resulting carbon blocks had weights ranging from 68.2 grams to 70.1 grams with a mean weight of 69.3 grams and a relative standard deviation of 1.2%. The carbon block air flow resistances (pressure drops), measured as described above, ranged from about 55 to about 63 inches of water with a mean value of 60.3 and a relative standard deviation of 5.5%. One hundred percent (100%) of the carbon blocks tested passed NSF 53 testing for cryptosporidium reduction. No detectable particles were measured in the effluent throughout the tests. The carbon blocks showed excellent VOC performance (<2 ppb breakthrough after the 50 gal test).

Comparative Example C5

Carbon blocks for a faucet mount application were made following the procedure described in Comparative Example C4 with the exception that the following formulation: "PICA GX203" (14%), "KURARAY YPH 20 MD" (31%), "TICONA GUR 2126" (15%), "TICONA GUR 4150-3" (33%) and "ENGELHARD ATS", (7%), totaling about 5000 grams, was used. Air flow resistances, as described above, of the carbon blocks ranged from about 45 to about 54 in. $H_2O$ (mean=48.8, relative standard deviation=8.0%. A representative block from this batch failed testing for NSF cryptosporidium removal. Another representative carbon block passed VOC removal testing. The effluent, after about 50 gal, was marginal indicating poor process capability (about 9.4 ppb breakthrough compared to about 15 ppb maximum allowable).

Activated Carbon

Table 2 lists several activated carbons with bulk density and BET Surface area data.

TABLE 2

| Activated Carbon | Bulk Density g/cc | BET Surface Area, $m^2/g$ |
| --- | --- | --- |
| "CALGON 3164" | 0.37 | 1247 |
| "PICA GX 203" | 0.49 | 1180 |
| "CALGON 3163" | 0.54 | >1100* |

TABLE 2-continued

| Activated Carbon | Bulk Density g/cc | BET Surface Area, m²/g |
|---|---|---|
| "PICA NC 506" | 0.51 | >1100* |
| "KURARAY PGW-100" and "KURARAY PGW-20" | 0.59 | 518 |

*These values are from manufacturer's specifications, all others are measured.

The following table summarizes VOC capacity for home water filter blocks using the activated carbons as listed in Table 3.

TABLE 3

| | Activated Carbon | Filter | Service Life for VOC[1] per unit filter volume |
|---|---|---|---|
| Comp. Ex. C6 | "CALGON 3164" | Faucet mount* | 9 gal treated per in³ |
| Comp. Ex. C7 | "CALGON 3163" | Refrigerator filter (Kenmore Advanced Part No. T1RFKB1) | 11 gal treated per in³ |
| Comp. Ex. C8 | "PICA GX 203"/"CALGON 3163" blend | Faucet mount* | 15 gal treated per in³ |
| Comp. Ex. C9 | "PICA GX 203" | Faucet mount* | 8 gal treated per in³ |
| Ex 5 | "KURARAY PGW-100" and "KURARAY PGW-20" | Faucet mount* | 48 gal treated per in³ |

*Made according to the procedure described in Example C1 with noted activated carbon(s).
[1]VOC (volatile organic compound) capacity is that measured according to NSF 53 (Drinking Water Treatment Units – Health Effects).

A VOC life per NSF 53 VOC test with $CHCl_3$ surrogate involves challenging a water filter with about 300 ppb chloroform in the test water. The service life of the water filter is measured by the gallons of water treated to an effluent concentration of less than 15 ppb, as explained in a publicly available National Sanitation Foundation (NSF) document in ANSI/NSF Standard 53. Table 3 shows that the VOC capacity of carbon block water filters (per unit volume) made with the carbon of the present disclosure is about 3× to about 6× greater than that of water filters made with standard commercially available activated carbon.

Example 6

The composite carbon blocks for Example 6 were prepared following the procedure described in Comparative Example C3, with the exception that the following formulation: "KURARAY PGW-100" (30%), "PGW-20" (43%), "ENGELHARD ATS" (7%), "TICONA GUR 2126" (10%) and "ICONA GUR 4150-3" (10%), totaling about 5000 g, was used. One hundred twenty-eight (128) blocks were produced and 8 representative blocks were tested for VOC service life according to NSF 53 test method. All eight (8) blocks passed the NSF 53 VOC test to the 50 gal test capacity. Effluent levels of chloroform at 50 gal ranged from about 2.1 to about 2.8 ppb. The test was continued to 70 gal and all eight (8) blocks of the first formulation passed the VOC test with effluent values ranging from about 2.2 to about 2.6 ppb. Additional blocks were tested to determine the maximum service life. In these tests the service life to about 15 ppb effluent ranged from about 120 to about 160 gallons.

Comparative Example C10

The composite carbon blocks for Comparative Example C10 were prepared following the procedure described in Comparative Example C3, with the exception that the following formulation: "PICA GX203" (7%), "PICA NC506" (55%), ENGELHARD ATS" (7%), "TICONA GUR 2126" (20%) and "TICONA GUR 4150-3" (11%), totaling 10,000 g (in two containers), was used. One hundred twenty-eight (128) blocks were produced and 8 representative blocks were tested VOC service life according to NSF 53 test method. All 8 blocks failed VOC testing at the 50 gal test volume. Effluent chloroform levels at 50 gal ranged about 16 to about 29 ppb, compared to the maximum allowable level of about 15 ppb.

The activated carbons listed in Table 4 were tested for VOC capacity in carbon blocks.

TABLE 4

| Activated Carbon | Mesh Size | Tapped density g/cc |
|---|---|---|
| "KURARAY CG 80X325" | 80 × 325 | 0.58 |
| "CALGON 3163" | 80 × 325 | 0.54 |
| "PICA NC506" | 80 × 325 | 0.51 |
| "PACCO HMM" | 80 × 325 | 0.60 |

The procedure described in Comparative Example C1 was followed with the exception that the following general formulation was used for all composite carbon blocks produced for Examples 7 and 8 and Comparative Examples C11 and C12: activated carbon specified in Table 5 (80%) and UHMW PE ("TICONA" GUR 2126) (20%).

The resulting composite carbon blocks exhibited the following dimensions using compression after baking: OD=1.5 inches (3.8 cm), ID 0.5 inch (1.3 cm) and length=2.4 inches (6.1).

In order to compare the capacity of the composite carbon blocks, breakthrough curves were integrated to estimate the total $CHCl_3$ removed over 250 gal. Table 5 summarizes the test data for these composite carbon blocks.

TABLE 5

| | | Chloroform Removed in 250-gal Test (grams) | | |
|---|---|---|---|---|
| | Activated Carbon | Test 1 | Test 2 | Average |
| Ex. 7 | "KURARAY CG 80X325" | 0.22 | 0.24 | 0.23 |
| Ex. 8 | "PACCO HMM" | 0.21 | 0.23 | 0.22 |
| Comp. Ex. C11 | "CALGON 3163" | 0.13 | — | 0.13 |
| Comp. Ex. C12 | "PICA NC503" | 0.15 | — | 0.15 |

The two carbons having a density of about 0.58 g/cc or greater, "KURARAY CG 80X325" and "PACCO HMM", exhibited the best performance.

Examples 9A-9N and Examples 9P-9R

Examples 9A-9N and Examples 9P-9R comprise sets of 64 carbon blocks made using the following formulation: "KURARAY PGW-20MD" (45.0), ENGELHARD ATS (7.0%), "KURARAY PGW-100MD" (10.0%), "KURARAY PGW-100MP" (10.0%), "TICONA GUR 2126" (10.0%) and "TICONA GUR 4150-3" (18.0%). The filling station consisted of a vibration table with a pneumatic single impactor (Model 1400-SI manufactured by Cleveland Vibrator Co., Cleveland, Ohio). The impactor delivered single impulses at a frequency of one displacement every 3 seconds (20 impacts per minute). The impactor was set at a pressure of about 80 psig to deliver energy per impact of 350 ft-lbs/cm.

TABLE 6

Data from the process experiment.

|  | Air Flow Resistance | | Block Mass (grams) | |
|---|---|---|---|---|
|  | Average | Std. Dev | Average | Std. Dev |
| Ex. 9A | 2.57 | 0.093 | 61.5 | 0.446 |
| Ex. 9B | 2.17 | 0.095 | 60.3 | 0.459 |
| Ex. 9C | 2.06 | 0.057 | 60.2 | 0.451 |
| Ex. 9D | 2.15 | 0.091 | 60.5 | 0.512 |
| Ex. 9E | 2.04 | 0.086 | 59.6 | 0.376 |
| Ex. 9F | 2.21 | 0.081 | 59.3 | 0.383 |
| Ex. 9G | 2.12 | 0.092 | 60.0 | 0.682 |
| Ex. 9H | 1.99 | 0.082 | 59.1 | 0.473 |
| Ex. 9I | 1.82 | 0.143 | 58.7 | 0.536 |
| Ex. 9J | 1.76 | 0.063 | 58.7 | 0.440 |
| Ex. 9K | 1.88 | 0.085 | 58.9 | 0.670 |
| Ex. 9L | 1.96 | 0.080 | 59.1 | 1.013 |
| Ex. 9M | 2.11 | 0.074 | 59.6 | 0.376 |
| Ex. 9N | 1.88 | 0.134 | 58.3 | 0.592 |
| Ex. 9P | 1.78 | 0.074 | 60.5 | 0.541 |
| Ex. 9Q | 1.86 | 0.061 | 61.3 | 0.360 |
| Ex. 9R | 1.82 | 0.059 | 60.1 | 0.475 |

Comparative Example C13

Comparative Example C13 was prepared following the procedure described in Comparative Example C1, with the exception that the molds were first filled to the top with formulation, followed by vibration on a low setting (3) of the vibration table. Carbon blocks were tested for uniformity of distribution by cutting the cylindrical block into 3 equal pieces, weighing each piece, and calculating the ratio of the bottom section (section closest to the table) to the top section (section farthest from the table). Results are listed in Table 7.

Example 10

Example 10 was prepared following the procedure described in Example 1, and sections prepared as in Comparative Example C13. Results are listed in Table 7.

TABLE 7

|  | Carbon Block number | Mass of 60 mm section (g) | | |
|---|---|---|---|---|
|  |  | Top | Middle | Bottom |
| Example 10 | 1 | 20.1 | 20.0 | 21.7 |
|  | 2 | 21.2 | 22.0 | 22.4 |
|  | 3 | 20.5 | 20.3 | 20.5 |
|  | 4 | 20.9 | 20.8 | 20.8 |
|  | Average | 20.6 | 20.8 | 21.3 |
|  | | Bottom/Top Ratio = 21.3/20.6 = 1.03 | | |
| Comparative Example C13 | 1 | 19.5 | 18.7 | 20.0 |
|  | 2 | 19.2 | 19.4 | 21.2 |
|  | 3 | 19.5 | 19.5 | 21.5 |
|  | 4 | 19.2 | 19.2 | 20.9 |
|  | Average | 19.3 | 19.2 | 20.9 |
|  | | Bottom/Top Ratio = 20.9/19.3 = 1.08 | | |

As the Bottom/Top Ratio approaches 1.00, uniformity along the length of the carbon block is improved.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A filtration matrix comprising a polymeric binder present in an amount no greater than 30% and an adsorptive media present in an amount between 70% and 90%, the adsorptive media comprising an activated carbon made from nut shells for the removal of contaminants from drinking water, the carbon having a bulk density of 0.54 g/cc or greater, and wherein the carbon BET surface area is 1100 m$^2$/g or less, and the VOC capacity of the matrix according to NSF-53 is 20 gal/in$^3$ or greater.

2. The filtration matrix of claim 1, wherein the bulk density is 0.57 g/cc or greater.

3. The filtration matrix of claim 2, wherein the bulk density is 0.60 g/cc or greater.

4. The filtration matrix of claim 1, wherein the BET surface area is 950 m$^2$/g or less.

5. The filtration matrix of claim 1, wherein the BET surface area is 550 m$^2$/g or less.

6. The filtration matrix of claim 1, wherein the polymeric binder comprises ultra high molecular weight polyethylene.

7. The filtration matrix of claim 1, comprising a VOC capacity according to NSF-53 of 30 gal/in$^3$ or greater.

8. The filtration matrix of claim 1, comprising a VOC capacity according to NSF-53 of 40 gal/in$^3$ or greater.

9. The filtration matrix of claim 1, wherein the polymeric binder is present in an amount of no greater than 15%.

10. The filtration matrix of claim 9, wherein the polymeric binder is present in an amount of no greater than 10%.

11. The filtration matrix of claim 1, wherein the adsorptive media is present in an amount of at least 85%.

12. The filtration matrix of claim 11, wherein the adsorptive media is present in an amount of at least 87%.

13. The filtration matrix of claim 1, wherein the carbon BET surface area is in the range of 518 m$^2$/g to 1100 m$^2$/g.

14. The filtration matrix of claim 1, wherein the activated carbon is powdered.

* * * * *